March 15, 1966 R. K. SMYTH ETAL 3,241,077
SELF-ADAPTIVE CONTROL SYSTEM ELIMINATING
VARIABLE UNWANTED COMPONENT
Filed July 6, 1961 6 Sheets-Sheet 1

*INVENTORS*
RICHARD K. SMYTH
DAVID G. BYLES
BY
ATTORNEY

INVENTORS
RICHARD K. SMYTH
DAVID G. BYLES
BY
ATTORNEY

March 15, 1966  R. K. SMYTH ETAL  3,241,077
SELF-ADAPTIVE CONTROL SYSTEM ELIMINATING
VARIABLE UNWANTED COMPONENT
Filed July 6, 1961  6 Sheets-Sheet 5

INVENTORS
RICHARD K. SMYTH
DAVID G. BYLES
BY
ATTORNEY

United States Patent Office 3,241,077
Patented Mar. 15, 1966

3,241,077
SELF-ADAPTIVE CONTROL SYSTEM ELIMINATING VARIABLE UNWANTED COMPONENT
Richard K. Smyth, Downey, and David G. Byles, Anaheim, Calif., assignors to North American Aviation, Inc.
Filed July 6, 1961, Ser. No. 122,125
17 Claims. (Cl. 328—165)

This invention relates to feedback control systems driving highly resonant loads, and more particularly to control systems employing self-adaptive notch filters for use with resonant modes having variable frequencies.

For purposes of exposition, a concept of this invention will be described with reference to an exemplary embodiment which is of peculiar utility in application to a closed loop control system. However, it will be readily apparent to those skilled in the art that the principles of the invention are generally applicable to open-loop systems. Further, it may be seen that the inventive principles described herein may be readily applied generally to the generation of a phasor signal which will vary its characteristics in accordance with the variation of similar characteristics of an input signal.

In the application of closed loop control systems to problems such as vehicle control, it is often necessary to deal with a highly resonant load or vehicle. When it is desired to apply closed loop control system techniques in the control of a highly resonant load, the dynamic response of the load may couple into the control system through the feedback sensors used for closed loop control. The resonant modes of the load may be driven unstable by the interaction between the resonant load and the closed loop control system dynamics, resulting in instability of the control system or damage to the load.

For example, in a flight control system for controlling the attitude of a relatively flexible aircraft or like vehicle which is subject to bending, the inertial attitude and attitude rate sensors, being necessarily mounted relative to the vehicle structure, will detect the resonant modes of bending of the vehicle structure in addition to detecting the rigid body motion or trajectory of the vehicle in inertial space. Such resonant modes may be excited by air gusts in the atmosphere, forces and moments applied by the vehicle control means or other sources of disturbance forces upon the vehicle. The detection of such structural resonant modes or body-bending modes by the flight control sensors serves to couple the vehicle body-bending resonant modes with the flight control system dynamics, causing the flight control system to respond to such mode. If a high enough gain and adverse phase shift or time phase are associated with such coupling, the response of the flight control system may act to produce forces and moments which reinforce such bending modes, and increase the resulting flight control system response. Such a condition would represent a form of flight control system dynamic instability and also could result in structural failure or break-up of the vehicle when the stresses induced upon the vehicle exceed its structural limits.

The problem of decoupling a vehicle control system from a bending mode is especially paramount in the design of large aerospace vehicles. In the case of large space vehicle boost engines, the structural resonant modes induced are often at frequencies which are close to the spectrum of control loop frequencies of the intended vehicle trajectory response. The problem is further aggravated in that the shapes and frequencies of the bending modes of such a vehicle vary during the flight or mission of the vehicle. Such variation occurs due to (1) changes in aerodynamic loading associated with changes in vehicle speed and attitude, (2) changes in mass and mass distribution due to expenditure of fuel (which may constitute over two-thirds of the take off weight of such vehicle), and (3) variations in the vehicle geometry due to staging or jettisoning of equipment such as launch booster stages which are adapted for use during only part of the vehicle flight or mission.

An arrangement to achieve decoupling of the flight control dynamics from the vehicle body bending modes may employ notch filters placed in the feedback loops of such control systems to filter out or attenuate that component of the sensor output or feedback signal which is induced by sensing of the vehicle bending mode.

Another arrangement is the location of the single sensor of interest at a suitable station in the vehicle, relative to the bending mode. In the case of an angular motion sensor such as rate gyro, for example, the sensor would preferably be located at an anti-node as to experience only translational vibratory motion associated with the bending mode, to which such solely translational motion the rate gyro is substantially insensitive. A translational accelerometer, on the other hand, would preferably be located at a nodal point of the bending mode as to experience only angular vibratory motion associated with the bending mode, to which such solely angular motion the translational accelerometer is substantially insensitive.

Other methods of decoupling the bending mode include the use of dual sensors placed on opposite sides of a node whereby the sense of the bending mode signal component in one sensor is opposed to that of the other, such that the sum of the output signals from such sensors is substantially devoid of a bending mode signal component.

All of these schemes are subject to the same limitations, namely, a reliance upon a prior knowledge of the fixed bending mode characteristic and an inherent lack of adaptability to a variable bending mode. Neither the single sensor anti-node installation scheme nor the opposed dual sensor installation scheme is effective where the bending mode nodal points are other than assumed due either to the nodal points moving or the frequency of the bending mode changing or both. Further, such sensor installation schemes are subject to the additional limitation that there be adequate space and provisions for actually installing the sensors at the required geometrical stations.

Use of the notch filter device is equally limited to fixed modes of known characteristics. Further, the design of such filters to present a substantial notch attenuation characteristic about a desired center frequency is achieved only with large associated excursions in the phase shift of such filter in the region of the center frequency. Hence, small differences between the notch filter center frequency and the actual frequency of the bending mode may result in increased coupling or actual destabilization of the dynamic response of the combined control system and structural bending mode.

Decoupling of a variable bending mode by means of a plurality of notch filters of various center frequencies would necessitate a complex device for measuring the frequency of the bending mode and for switching an appropriate one of said filters, in addition to suffering the weight, space and cost penalty of providing a large number of notch filters in order to achieve a desired range of frequencies with the necessary degree of resolution.

Accordingly it is an object of this invention to decouple resonant loads from the control system over a range of frequencies and with a minimum of geometrical and structural limitations.

In carrying out the principles of this invention in accordance with a preferred embodiment thereof, there is provided a first input narrow band pass filter having an adjustable tuned center frequency, a first integrating motor arranged to cooperate therewith for adjusting the center frequency thereof, a second feedback filter similar in construction and arrangement to the input filter and cooperating with the first integrating motor to provide a tuned center frequency common to that of said input filter, and an adjustable gain output element having its input in series circuit with the output of said input filter. The input of the feedback filter is responsively connected to the output of the adjustable gain output element.

Amplitude comparison means is provided for generating a signal indicative of the difference in amplitude between the outputs from said input and output filters. A second integrating motor is responsively connected to the output of said amplitude comparison means and arranged to adjust the gain of the output element for reducing the output from said amplitude comparison means to zero. Automatic frequency tracking means is provided for adjusting the center frequency of the narrow band pass input filter as a function of the deviation of said center frequency from a time-averaged frequency of the peak spectral density of the input signal to the input filter. Such frequency tracking means comprises the input and feedback filters and a phase discriminator responsively connected to said filters to provide an output signal component indicative of the phase shift between the outputs of said filters. The first integrating motor is responsively connected to the output of the phase discriminator for adjusting the common center frequency of the input and feedback filters for reducing the difference in phase between the outputs thereof to zero.

With the above described arrangement, the output of the adjustable gain output element when compared with the input signal to the input filter by means of a suitable summing device will suppress a time averaged peak spectral density component of the input signal. In the event of a variation either separately or concurrently in the gain and/or frequency of such peak spectral density signal the device will adapt the gain and center frequency of the gain element and input filter respectively, as required in order to continue to function as before in suppressing a time-averaged peak spectral density component of the input signal. Performance of the above described arrangement is unaffected by time-phase variations of the peak spectral density component of the input signal. An object of this invention, therefore, is to provide a self-adaptive notch filter having automatic frequency tracking means for suppressing a variable frequency peak spectral density signal component.

Another object of this invention is to provide an adjustable-frequency notch filter.

Still another object of this invention is to provide automatic frequency tracking for control of an adjustable-frequency notch filter.

A further object of this invention is to provide automatic means for adjusting the gain of an adjustable notch filter.

Still a further object of this invention is to provide a self-adaptive notch filter of minimum complexity, weight and cost that is relatively convenient to mechanize.

Yet another object of this invention is to provide means for decoupling a variable resonant mode of a controlled element from a feedback control system containing said element in which the installation of the feedback sensor relative to the nodes and anti-nodes of the resonant mode is not critical.

These and other objects of the invention will become apparent from the following description taken in connection with the accompanying drawings in which.

In the drawings, like reference characters refer to like parts.

Figure 1:
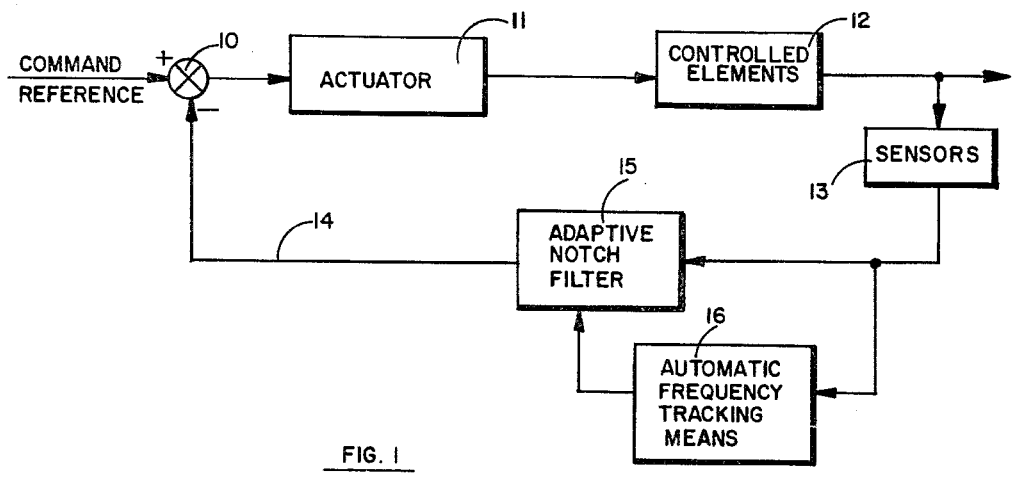
FIG. 1 is a block diagram of a single-sensor closed loop control system illustrating the arrangement of an adaptive notch filter within such control loop.

A major aspect of the invention is functionally depicted in FIG. 1 which illustrates a block diagram of a single-sensor closed-loop control system employing an adaptive notch filter. Command reference signals corresponding to the desired response of the system are applied at summing means 10 to actuator 11 for operation of a controlled element 12 comprising a resonant load. The response of controlled element 12 is detected by sensor 13 and fed back on line 14 to summing means 10 for comparison of the controlled element response or system output with the command reference. For example, a closed loop system which may advantageously employ the concepts of this invention may be found in U.S. Patent 2,964,269 issued to Buxton for an aircraft maneuver stabilizer.

An adaptive notch filter 15 is inserted in the feedback path 14 of FIG. 1 to filter a single resonant mode of the resonant element 12 by providing a sharp attenuation for a small bandwidth about a notch frequency equal to the single frequency of such mode. Automatic frequency tracking means 16 is provided for adjusting the notch frequency of 15 in response to changes in the resonant mode of element 12 as detected by feedback sensor 13.

If the feedback signal from sensor 13 is time-averaged, and a spectral analysis or Fourier decomposition made of the time-averaged signal, the time-averaged feedback signal may be viewed as consisting of a number of spectral components. In particular, there will be large amplitude spectral components at the frequency of any highly resonant modes demonstrated by controlled element 12, due to the persistence of such mode over the period of time-averaging which results in a higher amplitude for such time-averaged spectral component relative, say, to any one of the spectral components contributed only by the control mode. Hence, frequency tracking means 16 is required to be responsive to the frequency of the peak-spectral density component for a time-averaged signal, said tracking means varying its response as the frequency of said peak spectral density component changes in time. It is to be noted that the representative period of time-averaging the feedback signal represents a much shorter period than the infinitely larger time period over which frequency tracking means 16 is intended to perform the frequency tracking function.

Figure 2:
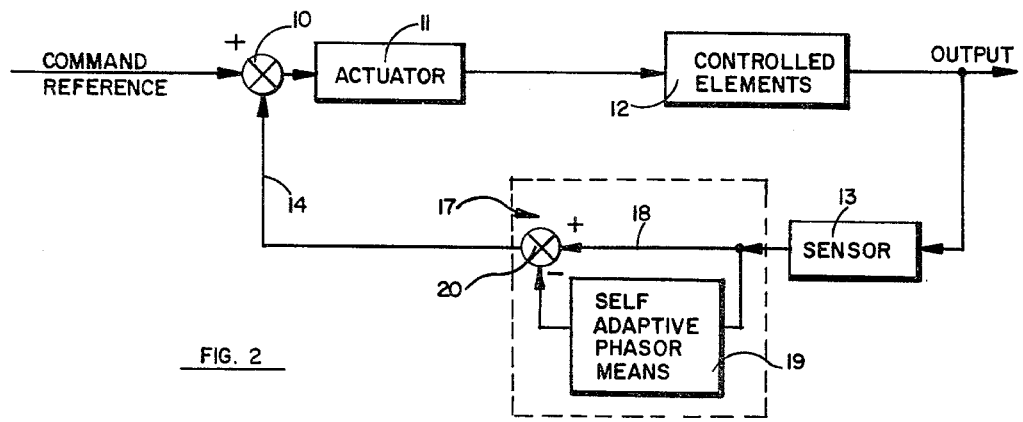
FIG. 2 is a block diagram of a single-sensor closed loop control system containing self-adaptive phasor means.

The functions of adaptive notch filter 15 and frequency tracking means 16 may be achieved by substitution of a self-adaptive phasor means in multi-loop combination with the input signal to the same, as described in FIG. 2.

Referring to FIG. 2 a block diagram of a single sensor system embodying the principles of the invention, is illustrated. The control system of FIG. 2 is substantially similar to and arranged the same as that in FIG. 1, but for the substitution of self-adaptive notch filter means 17 for elements 15 and 16 of FIG. 1. Filter means 17 is comprised of line 18 which is responsively connected to the output of sensor 13, self-adaptive phasor means 19 (more fully described in FIG. 3), and summing device 20 which is responsively connected to both line 18 and the output of phasor means 19.

A phasor or phasor signal is herein defined as a sinusoidal signal of a desired frequency, amplitude and time phase. The function of phasor means 19 is to generate a signal of like frequency, amplitude, and time-phase as the resonant mode signal component in the output from sensor 13. Subtracting the output of phasor means 19 from the signal on line 18 by means of summing device 20 results in a feedback signal on line 14 having a substantially attenuated resonant mode signal component. In other words, the combination represented by element 17 functions in the manner of a notch filter. Further, should the resonant mode sought to be thus attenuated vary its frequency, amplitude, or phase, the output from self-adaptive phasor means 19 will vary accordingly. Thus, the combination represented by element 17 functions as a self-adaptive notch filter.

Figure 3:
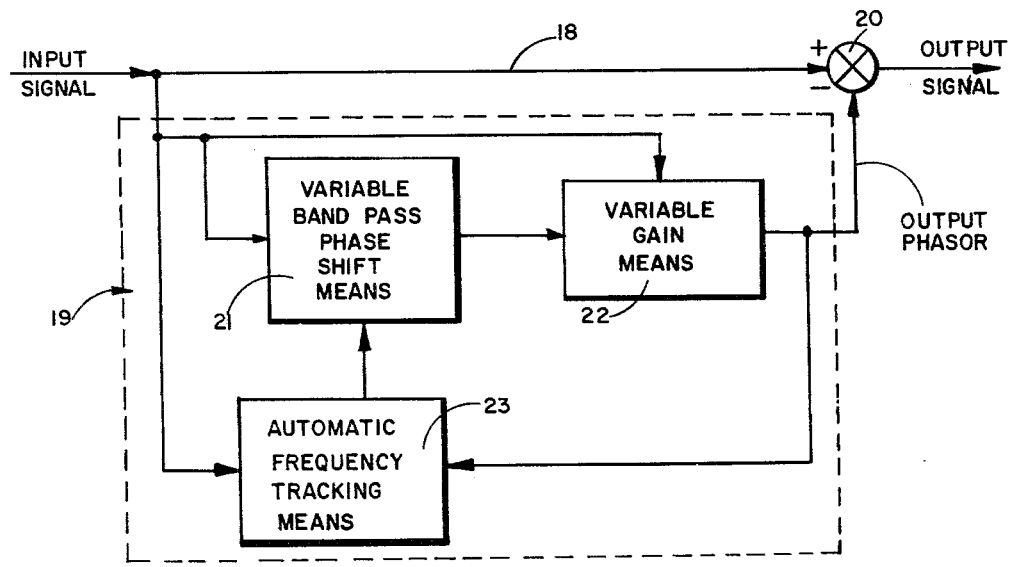
FIG. 3 is a block diagram of the phasor means of FIG. 2, illustrating the principle of the invention.

Referring to FIG. 3, a block diagram of an adaptive notch filter embodying the self-adaptive phasor means of FIG. 2 is illustrated. The adaptive notch filter of FIG. 3, is comprised of input signal line 18, self-adaptive phasor means 19, and summing device 20 all similar to and arranged substantially the same as like elements of FIG. 2. Self-adaptive phasor means 19 in FIG. 3 is comprised of variable band pass phase shift means 21 (such as a band pass filter, for example) having an adjustable center frequency for varying the amplitude and phase of an input signal component as a function of the deviation of the frequency of said signal component from said center frequency. The construction and arrangement of filter 21 will be described more fully hereinafter in connection with the description of the detailed embodiment of FIG. 4. Variable gain means 22, responsively connected to input signal line 18 and the output of phase shift means 21 is provided for adjusting the gain of the output signal from phase shift means 21 as a function of the deviation of the amplitude of said output signal from a time-averaged amplitude of the peak spectral density of said input signal.

Automatic frequency tracking means 23, responsively connected to input signal line 18 and to output of gain means 22, is provided for adjusting the center frequency of variable band pass phase shift means 21 as a function of the deviation of said center frequency from a time-averaged frequency of the peak spectral density of the input signal on line 18. By means of the arrangement described in FIG. 3, the output of gain means 22 represents a phasor of like frequency, amplitude and phase as the peak spectral density component of the input signal on line 18. Comparison of such phasor with the signal on line 18 by means of summing device 20 results in substantially cancelling or removing such peak spectral density component from the input signal which appears as an output signal from element 20.

Figure 4:
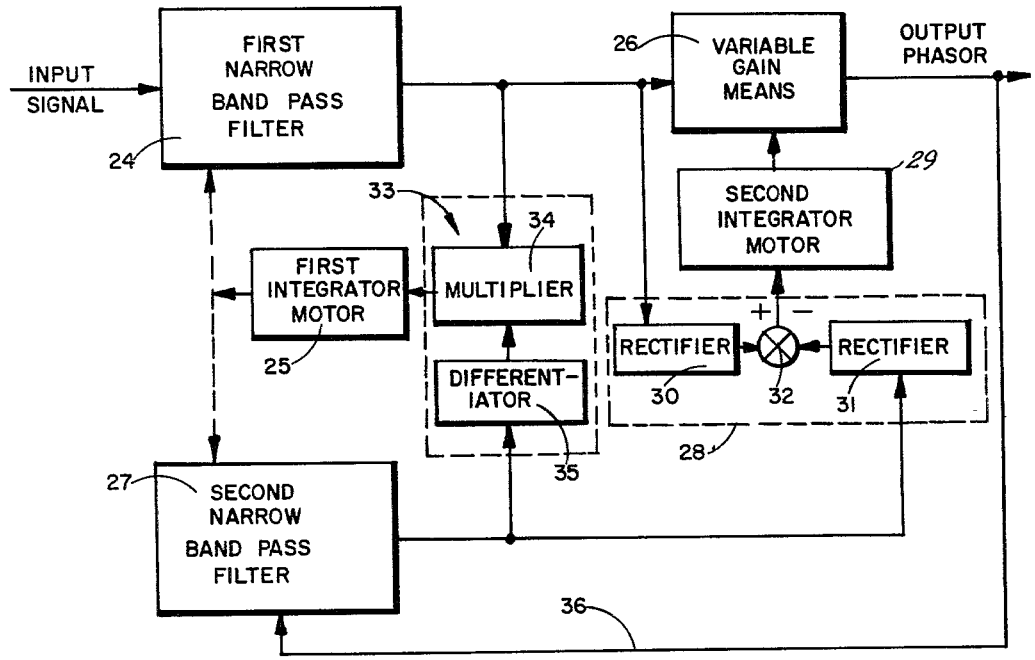
FIG. 4 is a functional block diagram illustrating a preferred embodiment of the invention.

Referring to FIG. 4, a block diagram of a preferred embodiment of the invention is shown. There is provided a first narrow bandpass input filter 24 (corresponding to phase shift means 21 of FIG. 4) having an adjustable tuned center frequency and having a transfer function of the form $$\frac{\frac{S}{\omega_0}}{\left(\frac{S}{\omega_0}\right)^2 + \frac{2\zeta}{\omega_0}S + 1}$$

where $\omega_0$ is the tuned center frequency and $\zeta$ is the damping ratio. Also provided is a first integrating motor 25 arranged to cooperate with said first filter for adjusting the center frequency thereof. Details of the filter circuit and its adjustment are set forth with greater particularity hereinafter.

Variable gain means is provided for varying the signal gain of the output from first input filter 24; and is comprised of: a potentiometer or like zero-phase variable-gain element 26 in series circuit with the output from first filter 24, a second narrow band pass filter 27 similar in construction and arrangement to first filter 24, said second filter 27 cooperating with first integrating motor 25 to provide a center frequency common to that of first filter 24. The variable gain means is further comprised of amplitude comparison means 28 for comparing the amplitudes of the outputs from said first and second filters, and a second integrating motor 29 responsively connected to the output of amplitude comparison means 28 and arranged to adjust the gain of variable gain element 26 in such a manner as to tend to reduce the output from comparison means 28 to zero. The amplitude comparison means may be comprised of a first rectifier 30 and second rectifier 31 responsively connected to the output of first filter 24 and second filter 27 respectively, and summing means 32 responsively connected to provide an output signal indicative of the difference between the outputs of said first and second rectifiers.

Automatic frequency tracking means is provided for controlling the center frequency of input filter 24, and comprises said input filter 24, the second or feedback filter 27, phase discriminator means 33 responsively connected to the output of each of filters 24 and 27, and said first integrating motor 25 responsively connected to the output of phase discriminator means 33 and arranged to cooperate with said filters for adjusting the common center frequency thereof in such a manner as to reduce the phase difference between the time-averaged output signals from said filters to zero. Phase discriminator means 33 is comprised of any suitable means known to those skilled in the art for producing a signal component indicative of the time phase difference between two phasors of like frequency. For example, phase discriminator means 33 may be comprised of an analog multiplier 34 responsively connected to the output of each of said first and second filters, and an analog differentiator 35 inserted in circuit between the output of one of the filters and the corresponding input to the multiplier.

Electronic multiplier 34 may be comprised of a circuit arrangement such as that described, for instance, at page 139 of "Analog Computer Techniques," McGraw-Hill (1956). Analog differentiator 35 may be comprised of an operational amplifier circuit such as that described, for instance in Fig. 4.21 at page 183 of "Electronic Analog Computers" (second edition), McGraw-Hill (1956), or other means for obtaining a time-phase quadrature relationship between the two inputs to multiplier 34.

Figure 5:
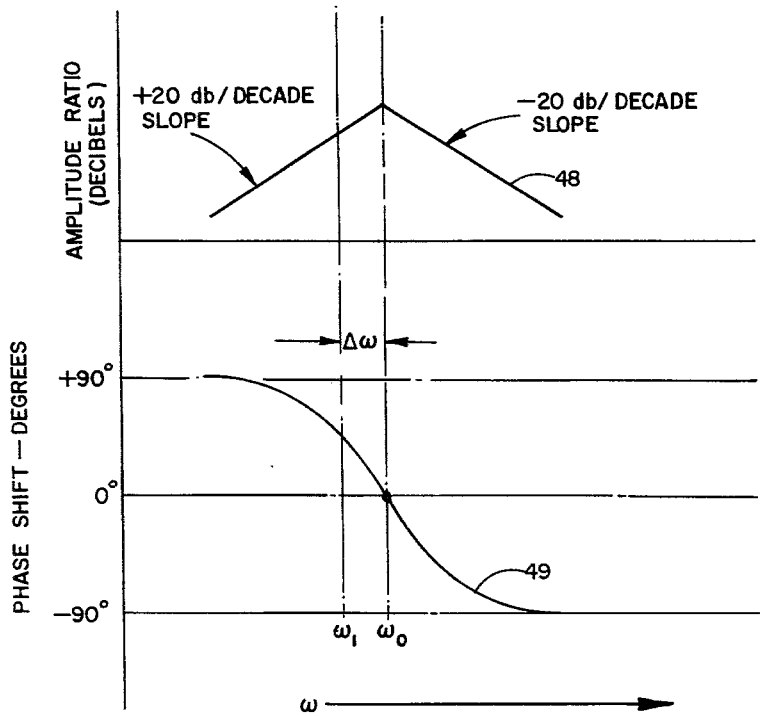
FIG. 5 is a Bode diagram of the frequency response of the narrow band pass filters of FIG. 4.

The operation of filters 24 and 27 of FIG. 4 may be understood by reference to FIG. 5, in which a Bode diagram of the amplitude and phase response of either of filters 24 and 27 is shown as a function of frequency. Curve 48 represents the amplitude response in decibels of the filter transfer function $$\frac{\frac{S}{\omega_0}}{\left(\frac{S}{\omega_0}\right)^2 + \frac{2\zeta}{\omega_0}S + 1}$$

For frequencies less than the filter center frequency $\omega_0$, the asymptotic slope of the amplitude ratio is a positive (+) 20 db/decade, as established by the free $s$ operator term in the numerator of the filter transfer function. At the break frequency $\omega_0$, the asymptotic slope of the amplitude ratio changes by a negative (−) 40 db/decade to minus (−) 20 db/decade slope due to the second order pole or denominator term of the filter transfer function. The actual peak amplitude ratio in the vicinity of the center frequency $\omega_0$ is a function of the damping ratio $\zeta$ of the filter transfer function. In any event, the maximum gain or amplitude ratio is seen to exist in the frequency region containing the center frequency $\omega_0$, and the gain will be attenuated for excursions in signal frequency $\omega_1$ above or below the value of $\omega_0$, as shown in FIG. 5.

Curve 49 represents the phase angle or phase shift response of the filter transfer function. For frequencies less than the filter center frequency $\omega_0$, the asymptotic phase angle is plus (+) 90° as established by the first order free $s$ operator term of the filter transfer function. At frequencies greater than $\omega_0$, the phase asymptote changes by minus (−) 180° to minus (−) 90°, due to the second order pole or denominator term of the filter transfer function, the phase angle going through zero (0°) at the filter center frequency $\omega_0$. A signal phase shift occurs for excursions in signal frequency $\omega_1$ above or below the value of $\omega_0$, the sense of the phase shift being a function of whether the signal frequency is greater than or less than the filter center frequency $\omega_0$. Hence, the phase shift associated with processing a signal through the filter is indicative of the sense of the difference, if any, between the signal frequency and the filter center frequency.

The cooperation between first filter 24 and second filter 27 of FIG. 4 may be explained by describing the operation of second filter 27 as the alter ego of first filter 24. In other words, an input signal component of a single frequency applied to the input of first filter 24 will undergo the same phase change and gain attenuation through first filter 24 that such signal will undergo as an output signal being applied on feedback line 36 to feedback filter 27, because of the similar filter transfer function and similar tuned center frequency displayed by feedback filter 27. Hence, by means of comparing the output of filter 24 (e.g., input to gain means 26 and feedback filter 27) with the output of feedback filter 27 to measure the performance of filter 27, means is provided for inferentially measuring the performance of first filter 24.

In normal or steady state operation, the common center frequency $\omega_0$ of input filter 24 and feedback filter 27 is equal to the frequency of the single frequency peak spectral component of the input signal. As previously explained, this peak component is due to the resonant bending mode of the resonant load. All other low amplitude spectral components are further attenuated by the filters, such that the input signal may be considered to be a single frequency signal of frequency $\omega_0$. The phase shift difference between the output of first filter 24 and the output of feedback filter 27 is zero, as indicated by the output of phase discriminator 33 (variable gain means 26 contributing *no* phase shift), indicating that the center frequency of feedback filter 27 is the same as the signal frequency. This condition further indicates that the center frequency of first filter 24 is the same as the signal frequency. The zero phase shift difference measured by phase discriminator 33 is indicated by a zero voltage level D.-C. signal component in the input to integrating motor 25. Accordingly, first integrating motor 25 will not be caused to operate to adjust the common center frequency of filters 24 and 27.

Should a deviation arise between the resonant mode frequency signal and the tuned center frequency of input filter 27, such input signal will be subected to a phase shift by filter 24 in a sense and by an amount indicative of such deviation in frequency. A like phase shift will occur between the output of first filter 24 and the output of feedback filter 27. This latter phase shift is manifested by the output of phase discriminator 33. Accordingly, first integrating motor 25 will be caused to operate to adjust the common tuned center frequency of first and second filters 24 and 27 in such a sense as to reduce the output signal from element 33 to zero. In this way, automatic frequency tracking occurs as to automatically adjust the tuned center frequency of first narrow band pass filter 24 to the frequency of a variable frequency bending mode. Details of the operation of multiplier 34, differentiator 35, and integrating motor 35 are more fully described below.

It is to be observed from the expression for the filter transfer function, however, that the gain of first filter 24 (as well as that of feedback filter 27) at a given frequency $\omega_1$ is an inverse function of the specific frequency selected for $\omega_0$. In other words, the higher the desired value for $\omega_0$, the lower will be the filter gain at a given frequency $\omega_1$. This phenomenon occurs in addition to attenuation of a single frequency signal due to excursions of the frequency of such signal about the filter center frequency $\omega_0$. Accordingly, compensation in signal gain as a function of the deviation of the signal frequency $\omega_1$ from the filter tuned center frequency $\omega_0$ is performed by adjustable gain element 26 in a manner which will now be described.

The desired phasor gain is unity. In other words, the ratio of the gain level of the output phasor from gain element 26 relative to the input gain level to element 24 is unity. The actual gain is represented by the product of the gain of first filter 24 and the gain setting of gain element 26. This same gain is also represented by the product of the gain of gain element 26 and the gain of feedback filter 27 due to the effective series arrangement of elements 26 and 27 and due to the similar transfer function of filter 27 relative to element 24. Hence, measuring a difference, if any, in amplitude between the input to gain element 26 and the output of element 27 indicates a deviation from unity in the gain of the combination of elements 26 and 27. Such a condition further indicates a deviation from unity in the gain product of the gain of elements 24 and 26 of FIG. 4. Accordingly, second integrating motor 29 will be caused to operate to adjust the gain of variable gain element 26 in such a fashion as to reduce any existing amplitude difference between the outputs of rectifiers 30 and 31 to zero, as manifested by the output from element 32 of FIG. 4. In this way, the gain product of the gains of element 24 and element 26 is automatically adjusted to unity. Hence, the output of element 26 will represent a phasor of precisely the proper amplitude for cancelling the resonant mode signal or peak spectral density component contained in the input signal by means of the summing element 20 in FIG. 3.

Figure 6:
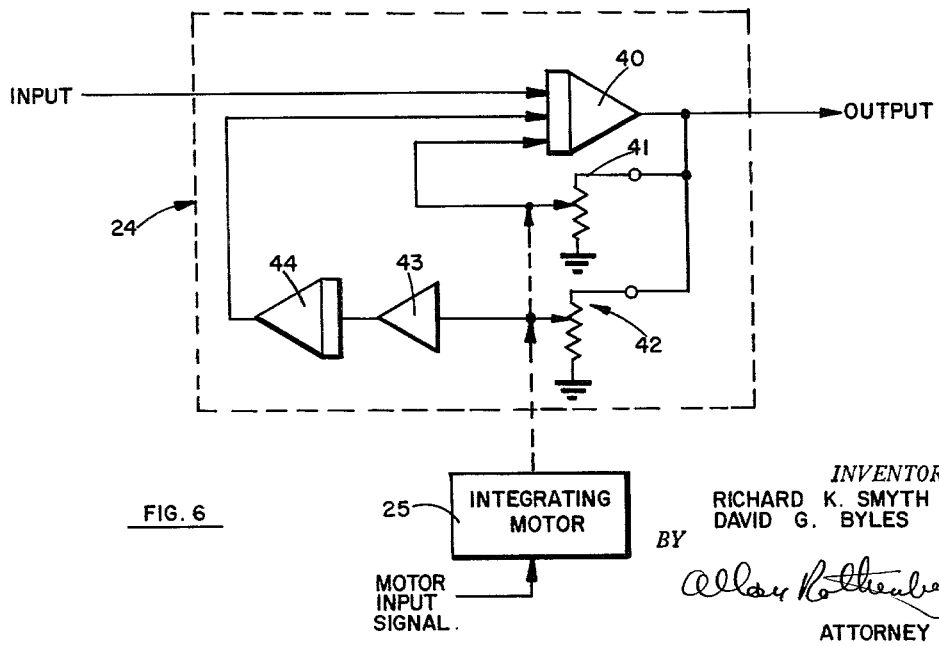
FIG. 6 is a block diagram of narrow band pass filter 24 of FIG. 4.

FIG. 6 illustrates a detail block diagram of first narrow band pass filter 24, having an adjustable center frequency, and shows the cooperation of element 24 with first integrating motor 25. The input signal to element 24 is applied to a first integrating amplifier 40, such as a Miller integrator or like device well known to those skilled in the analog computer art. The output of integrating amplifier 40 provides the output for the first filter 24. The output of integrator 40 is fed back to the input thereof by means of first feedback potentiometer 41. There is also provided a second feedback circuit comprising a second feedback potentiometer 42 responsively connected to the output of element 40. Sign changer 43 and second integrating amplifier 44 are inserted in series circuit with the output from second potentiometer 42. The output elements of potentiometers 41 and 42 are mechanically ganged to the output of motor 25.

That the combination of FIG. 6 functions as a narrow band pass filter may be appreciated from the following analytical description of the transfer function represented by such combination. Representing the output from element 40 as the integral of the sum of the inputs to element 40:

$$e_o = -\frac{1}{s}\left[e_i + K_1 e_o + \frac{K_2 e_o}{s}\right] \quad (1)$$

in which:

$e_o$ = output signal
$e_i$ = input signal
$K_1$ = gain of the first potentiometer
$K_2$ = gain of the second potentiometer
$s$ = Laplace operator notation Rearranging Equation 1:

$$e_o s^2 = e_i s - K_1 e_o s - K_2 e_o \quad (2)$$

Then transfer function of the device being the ratio of the output to the input, the ratio $e_o/e_i$ is next determined from Equation 2:

$$\frac{e_o}{e_i} = \frac{-s}{s^2 + K_1 s + K_2} \quad (3)$$

$$\frac{e_0}{e_1} = \frac{-\frac{s}{\omega_0}}{\left(\frac{s}{\omega_0}\right)^2 + \frac{2\zeta s}{\omega_0} + 1} \quad (4)$$

$$\omega_0 = K_2 \quad (5)$$

$$\zeta = \frac{K_1}{2\sqrt{K_2}} \quad (6)$$

Hence, it is to be appreciated that the device of FIG. 6 is a narrow bandpass filter having an adjustable tuned center frequency $\omega_0$ which is adjusted by means of second potentiometer 42. It is to be observed from Equation 6 that the damping ratio $\zeta$ is an inverse function of the square root of the gain $K_2$ of second potentiometer 42, while being directly proportional to the gain $K_1$ of first potentiometer 41. Therefore, in order to more perfectly maintain a fixed damping ratio (e.g., one which is independent of the frequency setting $\omega_0$ for filter 24), it would be desirable to employ a square root function potentiometer for element 41 or a square law function potentiometer for element 42. Such function potentiometers are well-known to those skilled in the analog computer art and are described for example, at page 314 of Analog Computers, second edition, McGraw-Hill (1956). For example, if a square root function potentiometer were employed for first potentiometer 41 and a linear potentiometer for element 42, then as the gain $K_2$ of element 42 increases proportionately with position displacement $\theta$ of the output from motor 25, the gain $K_1$ is only changed by the square root of such position:

$$\frac{\Delta K_1}{\Delta K_2} = \frac{\sqrt{\theta}}{\theta} \quad (7)$$

Hence, the proportion, $\Delta K_1 : \Delta K_2$, would remain the same for all shaft positions of motor 25, thereby maintaining the damping ratio $\zeta$ at a constant value.

Operation of phase discriminator 33 of FIG. 4 to provide a signal component indicative of the phase angle difference between two sinusoidal signals of like frequency may be appreciated from a direct analysis of the analog computation functions performed by elements 34 and 35. As will be shown, the function of differentiator 35 is only to contribute a time-phase quadrature relationship between the inputs to be multiplied by multiplier 34 for the purpose of achieving an output signal component indicative of the time-phase difference between the two signals, $e_1$ and $e_2$, between which a phase angle, $\phi$, exists.

Letting:

$$e_1(t) = E_1 \cos w_1 t \quad (8)$$

$$e_2(t) = E_2 (\cos w_1 t + \phi) \quad (9)$$

Applying the signal $e_2$ to the input of differentiator 35, the output $e_3$ from element 35 will be:

$$e_3 = \frac{de_2}{dt} = w_1 E_2 (\sin w_1 t + \theta) \quad (10)$$

Applying signals $e_1$ and $e_3$ to multiplier 34, the output $e_4$ from element 34 will be:

$$e_4 = e_1 \times e_3 \quad (11)$$

$$e_4 = w_1 E_2 E_1 \cos w_1 t (\sin w_1 t + \phi) \quad (12)$$

Employing a double angle trignometric identity:

$$e_4 = E_4 [\sin (2w_1 t + \phi) + \sin \phi] \quad (13)$$

where:

$$E_4 = \frac{w_1 E_2 E_1}{2} \quad (14)$$

The output signal from multiplier 34 is thus seen to consist of two component signals, an A.-C. signal component, $E_4 \sin (2w_1 t + \phi)$ and a D.-C. signal component, $E_4 \sin \phi$, the amplitude of which latter component is a function of the phase angle $\phi$. To the extent that the D.-C. signal is a function of the phase angle $\phi$, such signal component is, therefore, indicative of the phase angle. The useful D.-C. signal component of the multiplier output may be separated from the unused A.-C. signal component by filtering. Such filtering is well understood by those skilled in the art, and may be accomplished, for example, by the integrating action or attenuated frequency response of a D.-C. motor employed as the integrating motor of element 25. Hence, it is seen that the steady-state response of element 25 is indicative of the phase angle response of phase discriminator 33.

That the combination of FIG. 3, employing the structure of FIG. 4, functions as a notch filter at a center frequency $\omega_0$ may be further appreciated from the following analytical description of the equivalent transfer function for the combination comprising signal line 18 of FIG. 3, and the gain effect of input filter 24 and element 26 of FIG. 4 as applied at summing means 20 of FIG. 4. Such transfer function may be expressed as the ratio of the output signal to the input signal for the device of FIG. 3. Representing the transfer function of element 18 by unity (1.0), and the gain element 26 by the frequency invariant gain constant K, the expression for the effective transfer function $G_{(s)}$ between the input to signal line 18 and the output of summing means 20 may be written as follows:

$$G_{(s)} = 1 - \frac{\frac{sK}{\omega_0}}{\left(\frac{s}{\omega_0}\right)^2 + \frac{2\zeta s}{\omega_0} + 1} \quad (15)$$

Rearranging:

$$G_{(s)} = \frac{\left(\frac{s}{\omega_0}\right)^2 + \left(\frac{2\zeta}{\omega_0} - \frac{K}{\omega_0}\right)s + 1}{\left(\frac{s}{\omega_0}\right)^2 + \frac{2\zeta}{\omega_0}s + 1} \quad (16)$$

Figure 7:
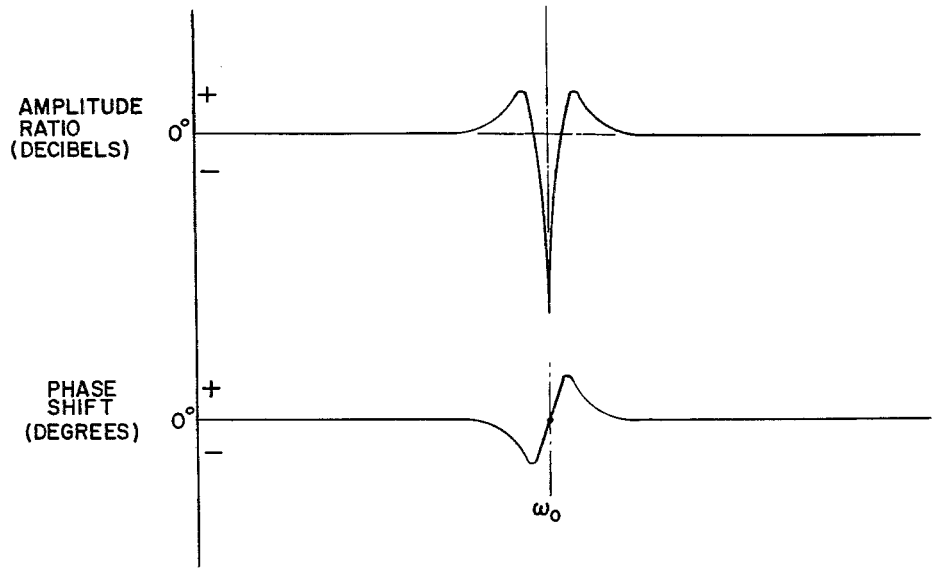
FIG. 7 is a Bode diagram of the frequency response of the device of FIG. 4.

The expression of Equation (16) contains a second order numerator and second order denominator having a common break frequency $\omega_0$. Therefore, the asymptotic minus (−) 40 db/decade slope of the amplitude ratio frequency response of the denominator term for frequencies above $\omega_0$ is offset by the asymptotic positive (+) 40 db/decade slope of the numerator term. Hence, the amplitude frequency response of the transfer function has a single asymptote slope of zero db/decade at frequencies above $\omega_0$ as well as at frequencies below, and demonstrates a gain level of zero decibels, equal to the D.-C. gain (e.g., zero frequency gain) as illustrated in FIG. 7. The net amplitude response deviation from 0 db at $\omega_0$ is determined by the difference between the positive and negative amplitude deviation contributed by the denominator and numerator terms, respectively, of Equation (16). Since that second order term having the smallest damping ratio has the largest amplitude deviation at the break frequency, the second order numerator term contributes a negative notch or gain attenuation which is reduced only by the lesser positive gain or lesser peak contributed by the second order denominator term. Hence, the notch filter response illustrated in FIG. 7 is seen to describe the frequency response of the transfer function of Equation (16).

It is recalled that the purpose of the gain servo loop of FIG. 4 including elements 26, 28, and 29, is to provide unity gain to the phasor output of element 19 of FIG. 3, when the tuned center frequency $\omega_0$ is not coincident with the bending mode frequency $\omega_1$, as well as when the two frequencies are coincident. In other words, the gain loop is intended to provide gain compensation of phasor means 19 during frequency tracking performance transients, as well as during the steady state situation where the center frequency $\omega_0$ is equal to the bending mode frequency $\omega_1$.

Figure 8:
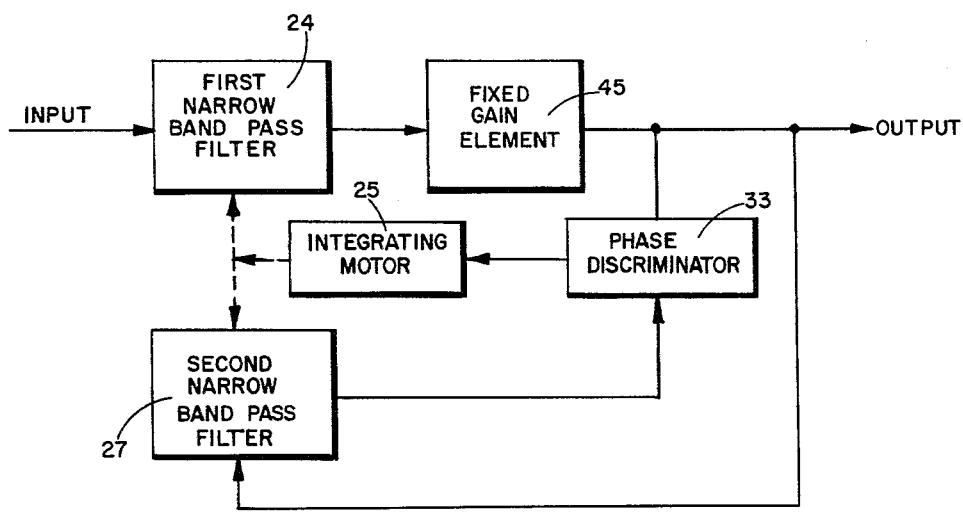
FIGS. 8, 9 and 10 are block diagrams of alternate embodiments of the concept of the invention.

If, however, under certain circumstances compromise of such gain compensation during frequency tracking transients may be tolerated to achieve a simpler and less complex device, steady-state or static gain compensation is yet required for adequate phasor cancellation. Such steady state gain compensation may be achieved by deletion of elements 26, 28, and 29 of FIG. 4 and substitution of fixed gain element 45 for variable gain element 26, as shown in FIG. 8. The gain of fixed gain element 45 is fixed at a value such that the product of such gain and the gain of first narrow band pass filter 24 at the center frequency $\omega_0$ is equal to unity. The desired value of such fixed gain is determined as a function of the damping ratio of the first narrow bandpass filter, as is seen from the following analytical development:

$$G_{(s)} = \frac{\frac{s}{\omega_0}}{\left(\frac{s}{\omega_0}\right)^2 + \frac{2\zeta}{\omega_0}s + 1} K_1 = 1.0 \quad (17)$$

where:

$K_1$ = gain of fixed gain element $$\frac{\frac{s}{\omega_0}}{\left(\frac{s}{\omega_0}\right)^2 + \frac{2\zeta}{\omega_0}s + 1} = \text{bypass filter transfer function}$$

$G(s)$ = phasor means transfer function
$s$ = Laplace operator notation

Substituting $j\omega$ for $s$ for examination of the phasor means response in the frequency domain:

$$G(s) = \frac{j\frac{\omega_0}{\omega_0}K_1}{-\left(\frac{\omega_0}{\omega_0}\right)^2 + j\frac{2\zeta\omega_0}{\omega_0} + 1} = 1.0 \quad (18)$$

$$G(s) = \frac{jK_1}{j2\zeta} = 1.0 \quad (19)$$

Therefore:

$$K_1 = 2\zeta \quad (20)$$

Hence, it is seen that the necessary gain of fixed gain element 45 is the reciprocal of the center frequency gain of the bandpass filter.

In the description of the operation of the device of FIG. 4, second bandpass filter 27 is referred to as the alter ego of first bandpass filter 24. Such descriptive term was employed for the reason that comparison of the output from filter 27 with the input to variable gain element 26 provides substantially the same information as would the comparison of the output from element 26 with the input to element 24. Such function requires a precision of identity between the transfer functions of filters 24 and 27, as well as requiring precise mechanical adjustment to achieve a common center frequency for a given shaft output from motor element 25. However, a practical advantage in the alter-ego configuration of FIG. 4 is the added stage of attenuation of random signal spectra interposed between phase discriminator 33 and the inputs thereto. Such added attenuation reduces the jitter or random wander of integrating motor 24 in response to the output from element 33, thereby improving frequency tracking resolution. Further, such added attenuation also reduces errors in the gain servo loop contributed by rectification of random input spectra by element 28 of FIG. 4. Such added attenuation will occur to random signal components without adverse effect upon the detection of the bending mode signal, where the filter center frequency $\omega_0$ is relatively close to the bending mode frequency $\omega_1$. In normal operation, the filter center frequency would be maintained fairly close to the bending mode frequency due to performance of the frequency tracking function.

A simpler mechanization would result, however, if the phase discriminator were allowed to employ noiser signals (e.g., the whole unattenuated spectrum of input signal components), thereby allowing deletion of the second bandpass filter 27. Such simpler mechanization would directly compare the output of gain element 25 with the input to filter 24, obviating the need of second filter 27, as shown in FIG. 9.

Figure 9:
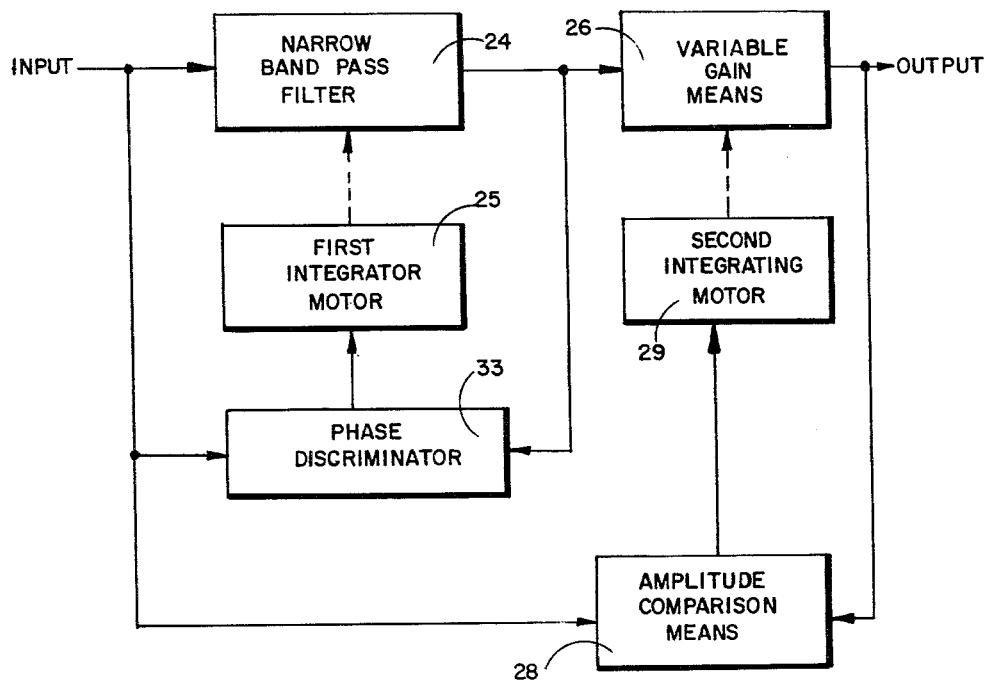

Referring to FIG. 9, a block diagram of an alternative embodiment of element 19 of FIG. 3 is illustrated. There is provided a narrow bandpass filter 24, a first integrating motor 25 arranged to co-operate with said filter for adjusting the center frequency thereof, a variable gain element 26, in series with filter 24, and a second integrating motor arranged to co-operate with said gain element for adjusting the gain of element 26.

First motor 25 is responsively connected to the output of a phase discriminator 33. Phase discriminator 33, in turn, is operatively connected to the output and input to the device to provide automatic frequency tracking. Second motor is responsively connected to the output of an amplitude comparison means 28. Comparison means 28 is, in turn, operatively connected to the output and input of the device to provide automatic gain compensation.

Figure 10:
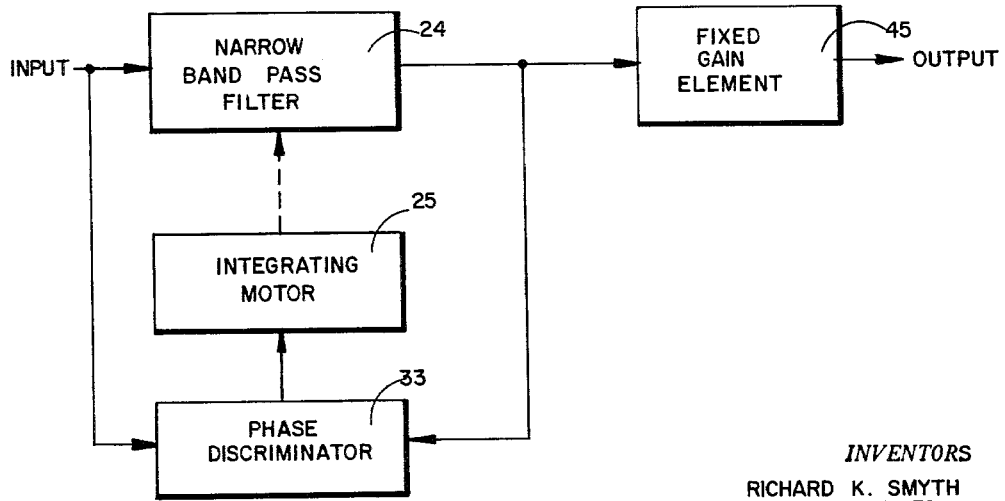

A further simplication of the simplified embodiment of FIG. 9 would result from elimination of the automatic gain compensation elements 28 and 29, and the substitution of a fixed gain element 45, as shown as shown in FIG. 10. The gain of element 45 is required to be the reciprocal of the center frequency gain of filter 27, for reasons which were explained in connection with the embodiment of FIG. 8.

The frequency tracking loop of FIG. 4 has been described as including elements 24, 25, 27 and 33. The performance of phase discriminator 33 in the frequency tracking loop has been further described by reference to Equations (13) and (14). The control signal output from element 33 has been described as the D.C. signal component from multiplier 34 (a component of element 33). Equation (14) indicates that the D.C. control signal from multiplier 34 is generally a function of the frequency $W_1$ of the bending mode signal or phasor, as well as a function of the phase shift $\phi$ through element 27. Such relationship does not affect the static null servo characteristic of the frequency tracking loop. However, such relationship does effect the dynamic performance or speed for response of the frequency tracking loop. In other words, at lower phasor frequencies the signal level or gain of the D.C. phase angle signal will be low, resulting in slow or sluggish response of the frequency tracking loop.

Such sluggish response is not necessarily unsatisfactory at low phasor frequencies. However, where the phasor is subject to occasional rapid changes in frequency, it may be desirable to provide a uniformly higher speed of response. Such uniformity may be achieved by making the gain of the frequency tracking loop relatively insensitive to phasor frequency. The gain of the frequency tracking servo loop can be made less sensitive to the frequency region of the phasor by interposing a low saturation-level input stage between the multiplier and each of the signal inputs to the multiplier, as shown in FIG. 11.

Figure 11:
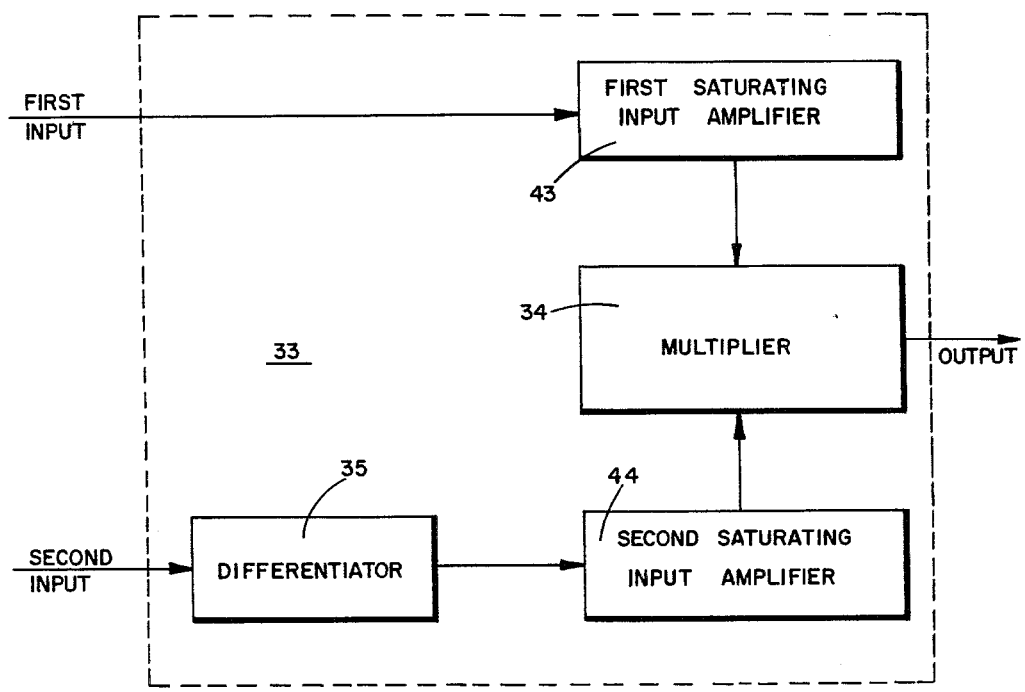
FIG. 11 is a block diagram of a phase discriminator.

Referring to FIG. 11, there is provided a first and second saturating input amplifier 43 and 44 interposed between multiplier 34 and the first and second input signals thereto, respectively. Each such saturating input amplifier may be comprised, for example, of a high-gain amplifier and a diode clipper circuit or other means well known in the art. The effect of such saturating input amplifiers is to cause the pair of input signals to multiplier 34 to resemble square waves of a fixed amplitude, but with the phase relationship preserved between pairs of signals of like frequency. Therefore, the D.-C. output signal component from multiplier 34 will have an amplitude almost directly proportional to the phase shift between the two phasor inputs to multiplier 34 and almost independent of the frequency of the two phasors. Accordingly, the speed of response of the frequency tracking loop will thus be made independent of the phasor frequency.

The source of the bending mode component of the feedback signal in the control systems described in FIGS.

1 and 2 has been attributed to the output from single feedback sensor 13. It is clear, however, that the feedback signal may be comprised of the outputs from several sensors. For instance, in an aircraft pitch attitude control system, the feedback sensors might consist of a pitch gyro for control, a pitch rate gyro for stabilization or damping, and an angular accelerometer for increased speed of response. The combined outputs of all three sensors would constitute the feedback signal. Further, the output of each such sensor might contain a signal component indicative of the same bending mode, but of a different phase and amplitude depending upon the type of sensor and its location relative to the mode nodes and anti-nodes. Hence, the combined signals from the several sensors would merely result in a single bending mode signal having an amplitude and phase representing the vector sum of the several bending mode signal components.

In a multiple sensor single feedback loop system where signals representing several different bending modes (e.g., different frequencies) are concurrently present, it may be necessary to provide several adaptive phasor devices one for each plurality of sensors which are subjected concurrently to a like mode, in order to adequately handle the presence of several modes. Where a particular one of such sensors is subjected to several different modes concurrently, that mode nominally having the highest amplitude would identify that particular combination of phasor device and plurality of sensors to which such single sensor may be connected to achieve a reduction in the bending mode signal component of the sensor output.

It will be seen that the device of this invention provides improved and self-adaptive means for filtering resonant modes having variable frequenies.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Automatic means for generating a phasor signal in response to a variable input power spectrum comprising adjustable filter means for transmitting a signal of like frequency as a time-averaged frequency of the peak spectral power density of said input spectra, amplitude means responsive to said power spectrum for adjusting the amplitude of said phasor signal to a value equal to a time-averaged value of said peak spectral power density, and phase means including said adjustable filter means for adjusting the center frequency of said filter to provide a 180° phase shift of said phasor signal relative to the time-average time phase of the peak spectral power density of said input spectra.

2. Automatic means for generating a phasor signal in response to a variable input power spectra comprising amplitude means responsive to the peak spectral power density of said power spectra for adjusting the amplitude of said phasor signal to a value equal to a time-averaged amplitude of the peak spectral power density of said input spectra, phase adjusting means responsive to the time-phase of the peak power spectral density for adjusting the phase of the phasor signal to a value of 180° relative to a time-averaged time phase of said peak spectral power density, and frequency tracking means responsive to the frequency of said peak spectral power density for adjusting the frequency of said phasor signal to a value equal to the time-averaged frequency of the peak spectral power density of the input spectra.

3. Self-adaptive means for generating a phasor in response to a time-averaged variable power spectrum, said phasor having an amplitude and frequency equal to, and a time phase opposed to, that for the peak spectral density of said time averaged power spectra, said self-adaptive means comprising: first and second narrow band pass filter, each having an adjustable tuned center frequency and having a transfer function of the form, $$\frac{\frac{s}{\omega_0}}{\left(\frac{s}{\omega_0}\right)^2+\frac{2\zeta s}{\omega_0}+1}$$

where $\omega_0$ is a common tuned center frequency and $\zeta$ is a common damping ratio; a first integrating motor arranged to cooperate with said filters for adjusting the common center frequency thereof; an adjustable gain element in circuit with the output of said first filter, the input of said second filter being connected in circuit with the output of said gain element; a first and second rectifier connected to the output of said first and second filter respectively; comparison means responsively connected to said rectifiers for providing an output signal indicative of the difference in amplitude between the output signals from said first and second rectifiers; a second integrating motor responsively connected to the output of said comparison means and arranged to cooperate with said adjustable gain element for adjusting the gain thereof to reduce the difference in amplitude between the inputs to said comparison means; a phase discriminator responsively connected to the output from each of said first and second filter for providing a signal component indicative of the time phase difference between the output signals from said filter and second filters; said first integrating motor being responsively connected to the output of said phase discriminator for adjusting the common tuned center frequency of said first and second filters to that value for which the time-phase difference between the output signals from said first and second filters is zero, said adjusted value corresponding to a time-average frequency of the peak spectral power density of said input spectra.

4. The device of claim 3 in which said phase discriminator comprises a multiplier responsively connected to the output of said first and second filter, a differentiator inserted between said one side filters and said multiplier, and D.-C. filter means comprising said first integrating motor.

5. In a control system having a feedback path for controlling a load having a variable resonant mode, an adaptive notch filter comprising: phasor signal means in parallel with said feedback path and responsive to the feedback signal input to said feedback path for generating a phasor signal having a frequency, phase, and amplitude corresponding to a time-averaged peak spectral density contributed by said variable resonant mode of said load; and summing means for comparing said phasor signal with the input signal to said feedback path, whereby said phasor signal nulls the signal component of said feedback signal contributed by said variable resonant mode of said load.

6. The device of claim 5 in which the phasor signal means comprises: variable narrow band pass phase shift means having an adjustable center frequency for varying the amplitude and phase of an input signal component as a function of the deviation of the frequency of said signal component from said center frequency of said phase shift means, said phase shift means being responsively connected to the input of said device; variable gain means in series circuit with the output of said phase shift means for adjusting the gain of the output signal from said phase shift means as a function of the deviation of the amplitude of said output signal from a time-averaged amplitude of the peak spectral density of said input signal; automatic frequency tracking means for adjusting the center frequency of said narrow band pass phase shift means as a function of the deviation of said center frequency from a time-averaged frequency of the peak spectral density of said input signal.

7. Phasor signal means comprising: variable narrow band pass phase shift means having an adjustable center frequency for varying the amplitude and phase of an input signal component as a function of the deviation of the frequency of said signal component from said center frequency of said phase shift means, said phase shift means being responsively connected to the input to said phasor signal means; variable gain means in series circuit with the output of said phase shift means for adjusting the gain of the output signal from said phase shift means as a function of the deviation of the amplitude of said output signal from a time-averaged amplitude of the peak spectral density of said input signal; automatic frequency tracking means for adjusting the center frequency of said narrow band pass phase shift means as a function of the deviation of said center frequency from a time-averaged frequency of the peak spectral density of said input signal.

8. Phasor signal means comprising: variable narrow band pass phase shift means, including a first narrow band pass filter responsively connected to an input signal and having an adjustable tuned center frequency, a first integrating motor arranged to cooperate with said filter for adjusting the center frequency thereof; variable gain means including a variable gain element in series circuit with the output from said first band pass filter, a second narrow band pass filter similar in construction and arrangement to said first filter and responsively connected to the output of said variable gain element, said second filter cooperating with said first integrating motor to provide a center frequency common to that of said first filter, amplitude comparison means for comparing the amplitudes of the outputs from said first and second filters, said amplitude comparison means comprising a first and second rectifier responsively connected to the output of said first and second filter respectively, summing means responsive to the difference between the outputs from said first and second rectifiers, and a second integrating motor responsively connected to the output of said amplitude comparison means and arranged to adjust the gain of such variable gain element for reducing the output from said amplitude comparison means to zero; automatic frequency tracking means including said first filter, said second filter, phase discriminator means comprising a multiplier responsively connected to the output of each of said first and second filters and a differentiator inserted in circuit between the output of one of said filters and the corresponding input to said multiplier, and said first integrating motor responsively connected to the output of said phase discriminator means and arranged to cooperate with said filters for adjusting the common center frequency thereof to reduce the phase difference between the time averaged output signals from said filters to zero.

9. Phasor signal means comprising: a first narrow band pass filter responsively connected to an input signal and having an adjustable tuned center frequency, a first integrating motor arranged to cooperate with said first filter for adjusting the center frequency thereof, a variable gain element in series circuit with the output from said first band pass filter; a second narrow band pass filter similar in construction and arrangement to said first filter and responsively connected to the output of said variable gain element, said second filter cooperating with said first integrating motor to provide a center frequency common to that of said first filter, amplitude comparison means for comparing the amplitudes of the outputs from said first and second filters, a second integrating motor responsively connected to the output of said amplitude comparison means and arranged to adjust the gain of said variable gain element for reducing the output from said amplitude comparison means to zero, phase discriminator means responsively connected to the output of each of said input and feedback filters, said first integrating motor being responsively connected to the output of said phase discriminator means and arranged to cooperate with said filter for adjusting the common center frequency thereof to reduce the phase difference between time-averaged output signals from said filters to zero.

10. Phasor signal means comprising: a narrow band pass input filter responsively connected to an input signal and having an adjustable tuned center frequency, a first integrating motor arranged to cooperate with said input filter for adjusting the center frequency thereof, a variable gain output element in series circuit with the output from said input filter, a narrow band pass feedback filter similar in construction and arrangement to said input filter and responsively connected to the output of said output element, said feedback filter cooperating with said first integrating motor to provide a center frequency common to that of said input filter, a first and second rectifier responsively connected to the output of said input and feedback filter respectively, summing means responsive to the difference between the outputs from said first and second rectifiers, a second integrating motor responsively connected to the output of said summing means and arranged to adjust the gain of said output element for reducing the output from said summing means to zero, a multiplier responsively connected to the output of each of said first and second filters, a differentiator inserted in circuit between the output of one of said filters and the corresponding input to said multiplier, said first integrating motor being responsively connected to the output of said multiplier and arranged to cooperate with said filters for adjusting the common center frequency thereof to reduce the phase difference between time-averaged output signals from said filters to zero.

11. Phasor signal means comprising: variable narrow band pass phase shift means, including a first narrow band pass filter responsively connected to an input signal and having an adjustable tuned center frequency, an integrating motor arranged to cooperate with said filter for adjusting the center frequency thereof; gain means in series circuit with the output from said first band pass filter, a second narrow band pass filter similar in construction and arrangement to said first filter and responsively connected to the output of said gain element, said second filter cooperating with said integrating motor to provide a center frequency common to that of said first filter; automatic frequency tracking means including said first filter, said second filter, phase discriminator means responsively connected to the output of each of said first and second filters and said first integrating motor responsively connected to the output of said phase discriminator means and arranged to cooperate with said filters for adjusting the common center frequency thereof to reduce the phase difference between the time averaged output signals from said filters to zero.

12. Self-adaptive filter means comprising a narrow band pass filter having an adjustable tuned center frequency, an integrating motor arranged to cooperate with said filter for adjusting the tuned center frequency thereof, and a phase discriminator responsively connected to an input and output of said self adaptive means for providing an output signal component indicative of the time-phase difference between said input and output, said integrating motor being responsively connected to the output of said phase discriminator for reducing the time averaged time-phase difference between the inputs to said phase discriminator.

13. The device of claim 12 in which said filter comprises: a first and second integrating amplifier, a first and second potentiometer, and an analog sign-changer, the input to said potentiometers being connected across the output of said first integrating amplifier, the output of said potentiometers being connected across the input of said first integrating amplifier, said second integrating amplifier and said analog sign changer being interposed in series circuit with said second potentiometer.

14. The device of claim 12 further comprising an adjustable gain element in series circuit with said filter, a second integrating motor arranged to cooperate with said gain element for adjusting the gain thereof, an amplitude comparison means responsively connected to an input and output of said self-adaptive means for providing an output signal indicative of a signal amplitude difference between said input and output, said second integrating motor being responsively connected to the output of said amplitude comparison means to reduce the amplitude of the output signal from said comparison means.

15. Automatic means for generating a phasor signal in response to a variable input power spectrum, comprising frequency means for generating a signal of like frequency as a time-averaged frequency of the peak spectral power density of said spectrum, amplitude means responsive to said power spectra for adjusting the amplitude of said phasor signal to a value equal to the time averaged amplitude of said peak spectral power density, and phase means responsive to said power spectra for adjusting the time phase of said phasor signal; said frequency means comprising a first narrow-band pass filter having an adjustable tuned center frequency, and having a transfer function of the form $$\frac{\frac{s}{\omega_0}}{\left(\frac{s}{\omega_0}\right)^2+\frac{2\zeta}{\omega_0}s+1}$$

where $\omega_0$ is the tuned center frequency, and $\zeta$ is the damping ratio; and a first integrating motor arranged to cooperate with said filter for adjusting said frequency.

16. The device of claim 15 wherein said amplitude means comprises an adjustable gain element responsively connected to the output of said frequency means, a second narrow band pass filter similar to said first band pass filter and responsively connected to the output of said gain element, a first and second rectifier connected to the output of said first and second filter respectively, comparison means for providing an output signal indicative of the difference in amplitude between the output signals from said first and second rectifiers, a second integrating motor responsively connected to the output of said comparison means and arranged to cooperate with said adjustable gain element for adjusting the gain thereof, to reduce the difference in amplitude between the inputs to said comparison means.

17. The device of claim 16 wherein said phase means comprises said frequency means, said second narrow band pass filter responsively coupled to said first integrating motor for adjusting the center frequency of said second filter, a phase discriminator responsively coupled to the outputs of said frequency means and said second filter, said first integrating motor being responsively connected to the output of said phase discriminator, said first integrating motor cooperating with said phase discriminator and said first and second filters to adjust said filters to provide a phase shift of zero at a center frequency equal to a frequency of the time-averaged peak spectral density of the input spectra.

References Cited by the Examiner
UNITED STATES PATENTS

| | | |
|---|---|---|
| 1,535,538 | 4/1925 | Maxfield et al. |
| 1,794,932 | 3/1931 | Usselman _____ 329—139 X |
| 2,917,626 | 12/1959 | Usher _____ 328—127 |
| 2,931,901 | 4/1960 | Markusen _____ 328—167 |

ARTHUR GAUSS, *Primary Examiner.*

JOHN W. HUCKERT, *Examiner.*